United States Patent
Masumoto et al.

(10) Patent No.: US 8,039,114 B2
(45) Date of Patent: Oct. 18, 2011

(54) RESIN COMPOSITION AND MULTILAYER STRUCTURE USING THE SAME

(75) Inventors: Hiroki Masumoto, Osaka (JP); Kouji Yamada, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 516 days.

(21) Appl. No.: 12/349,774

(22) Filed: Jan. 7, 2009

(65) Prior Publication Data

US 2009/0186233 A1 Jul. 23, 2009

(30) Foreign Application Priority Data

Jan. 15, 2008 (JP) ................. 2008-006035

(51) Int. Cl.
*B32B 27/34* (2006.01)
*B32B 27/08* (2006.01)
*C08K 3/32* (2006.01)

(52) U.S. Cl. .................... 428/474.4; 524/417

(58) Field of Classification Search ............. 428/474.4; 524/417
See application file for complete search history.

(56) References Cited

U.S. PATENT DOCUMENTS 4,792,484 A 12/1988 Moritani

2007/0275197 A1 11/2007 Chow et al.
2008/0070052 A1 3/2008 Chow et al.

FOREIGN PATENT DOCUMENTS

| EP | 0 249 051 | | 5/1987 |
| JP | 2000-136281 | * | 5/2000 |
| JP | 2001-151972 | | 6/2001 |

OTHER PUBLICATIONS

English Language Abstract JP 2001-151972, Jun. 2001.
English Language Abstract JP 2000-136281, May 2000.

* cited by examiner

*Primary Examiner* — William Cheung
(74) *Attorney, Agent, or Firm* — Greenblum & Bernstein, PLC

(57) ABSTRACT

It is disclosed that a resin composition comprising EVOH resin (A), polyamide resin (B) and inorganic salt (C) capable of forming a hydrate wherein the content amount of the inorganic salt (C) is in the range of 2 to 50 parts by mass based on 100 parts by mass of the EVOH resin (A), and the mass ratio ((B)/(C)) of the polyamide resin (B) to the inorganic salt (C) is in the range of 95/5 to 5/95. The resin composition exhibits excellent gas barrier property and less elution of EVOH resin even after hot water treatment, and excellent long-run processability.

13 Claims, 1 Drawing Sheet

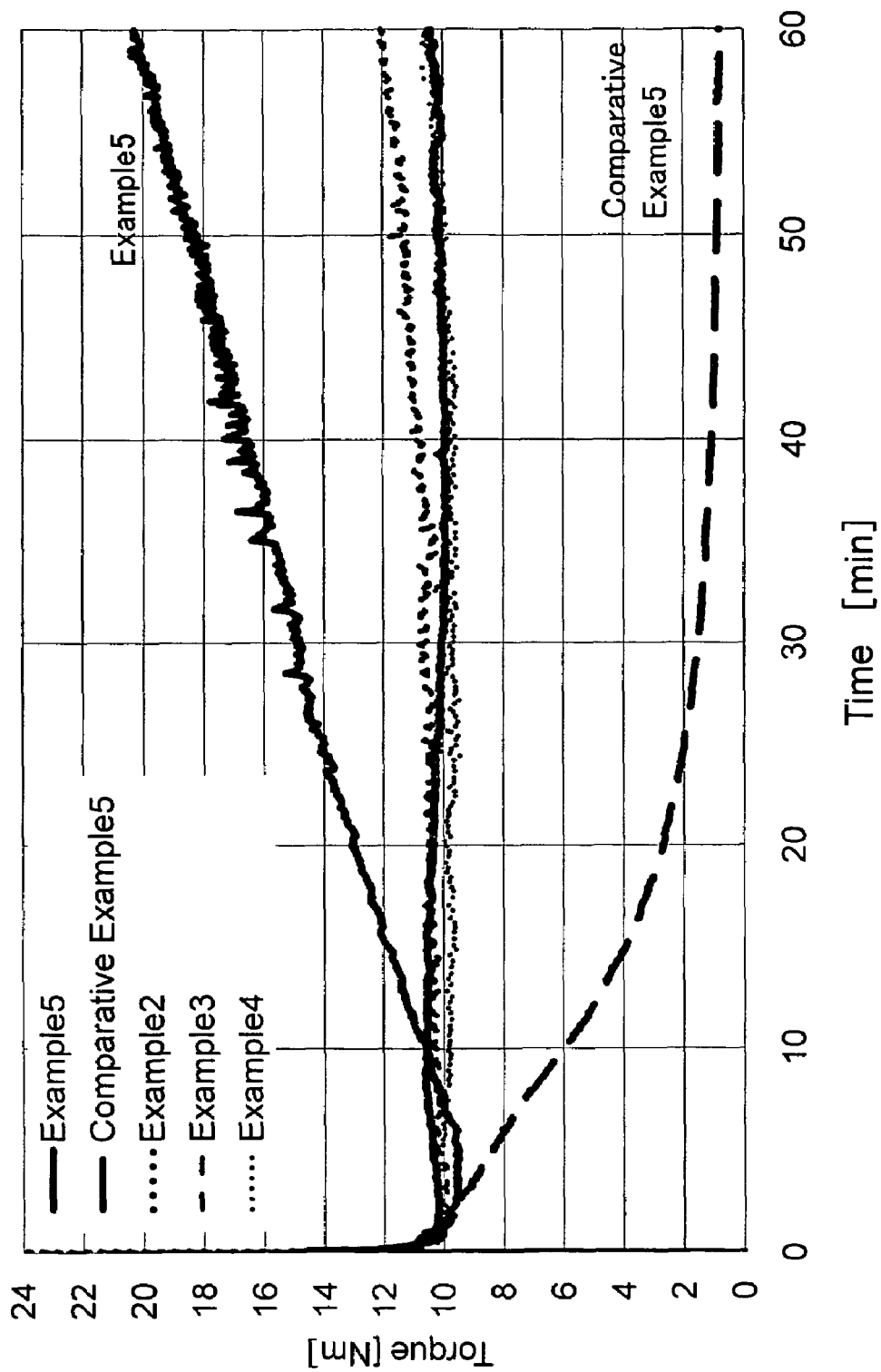

RESIN COMPOSITION AND MULTILAYER STRUCTURE USING THE SAME

BACKGROUND OF THE INVENTION

1. Field of the Invention

The present invention relates to a resin composition of saponified ethylene-vinyl ester copolymer (hereinafter, called as "EVOH resin") having gas barrier property against long-time hot water treatment, and more particularly to a resin composition that enables to suppress elution of EVOH resin against retort treatment, and produce a packaging film having excellent gas barrier property and long-run processability, as well as a multilayer structure using the resin composition.

2. Prior Art

Saponified ethylene-vinyl ester copolymer (EVOH resin) is utilized as a food packaging film and the like, because of its excellent gas barrier property against oxygen, odor, and the like. A film made of EVOH resin, however, may be whitened, or the gas barrier property of the film may be lowered, or a package made of the film may be deformed, if the film is subjected to long-time hot water treatment such as retort treatment.

A resin composition comprising EVOH resin and a drying agent is known as a resin composition capable of producing a packaging film having excellent gas barrier property against hot water treatment. For instance, U.S. Pat. No. 4,792,484 proposes a multilayer film produced by sandwiching an intermediate layer of a resin composition containing dispersed phosphate salt particles such as sodium phosphate, as a drying agent, between thermoplastic resin films of polyethylene, polypropylene, polyvinyl chloride, or the like. The multilayer film is capable of preventing the gas barrier property of EVOH resin from lowering by water absorption, utilizing that the drying agent absorbs moisture intruded through an end of the film, or moisture permeated through an outer layer of the thermoplastic resin film.

There is also known a technique of adding polyamide resin to impart hot water resistance to EVOH resin. For instance, JP2001-151972A discloses that a multilayer film using a resin composition containing 70 to 95 wt % of EVOH resin, 3 to 25 wt % of aliphatic polyamide resin, and 2 to 13 wt % of semi-aromatic polyamide retains the gas barrier property, even after being subjected to a condition of 20° C. and 65% RH for three weeks; and that the shape of a packaging film using the multilayer film is retained even after heat sterilization, with no or less whitening.

The applicant has filed an application (see JP2000-136281A) directed to a multilayer film for use in boil sterilization or retort sterilization, comprising an intermediate layer of a resin composition containing EVOH resin, alcohol-soluble polyamide resin, and phosphate salt; and outer layers of a thermoplastic resin film. The publication discloses that the resin composition of the intermediate layer has excellent long-run processability, gas barrier property against retort treatment, and appearance (no or less whitening). The resin composition disclosed in the publication is prepared by: immersing a porous precipitate of EVOH resin in an aqueous solution of phosphoric acid to introduce the phosphoric acid in the EVOH resin, followed by drying in a batch type fluid bed dryer and then a batch type hopper dryer; and melt-kneading the polyamide resin.

SUMMARY OF THE INVENTION

As described above, there are proposed a variety of techniques and multilayer films capable of retaining gas barrier property against long-time hot water treatment, and retaining a translucent appearance of a packaging film. However, since EVOH resin has high affinity to water, in the case where a multilayer film containing the resin composition is subjected to hot water treatment, the EVOH resin may be eluted through a sectional portion of the multilayer film. Particularly, if a drying agent is added, elution of EVOH resin is likely to be increased. In addition, if the content amount of polyamide resin is small, elution of EVOH resin from the resin layer is likely to be increased. On the other hand, if the content ratio of polyamide resin with respect to a resin composition is increased, long-run processability may be lowered, and it may become difficult to process the resin composition.

An object of the invention is to provide a resin composition having excellent gas barrier property against hot water treatment and excellent long-run processability, and capable of suppressing elution of EVOH resin.

The resin composition of the invention comprises an EVOH resin (A), a polyamide resin (B), and an inorganic salt (C) capable of forming a hydrate, wherein the content amount of the inorganic salt (C) is in the range of 2 to 50 parts by mass based on 100 parts by mass of the EVOH resin (A), and a mass ratio ((B)/(C)) of the polyamide resin (B) to the inorganic salt (C) is in the range of 95/5 to 5/95.

The resin composition of the invention is capable of reducing an eluted amount of EVOH resin, even if a relatively large amount of inorganic salt (C) capable of forming a hydrate is contained. Accordingly, both the gas barrier property against hot water treatment, and the effect of suppressing elution of EVOH resin can be obtained. The above effects are conceivably obtained as follows. A network structure is formed by a molecular interaction between EVOH resin and polyamide resin. The inorganic salt (C) is enclosed in the network structure. Thereby, the inorganic salt (C) sufficiently functions as a drying agent in hot water treatment, and elution of EVOH resin is suppressed. The above effect is an unexpected effect different from the effect recited in the publications. Specifically, even if the amount of polyamide resin (B) with respect to EVOH resin is relatively small, as compared with the amount of the polyamide resin in a composition to be generally used in hot water treatment, or even if a multilayer film is made of a resin composition containing a relatively large amount of inorganic salt (C) capable of forming a water-soluble hydrate, the resin composition of the invention is capable of suppressing elution of EVOH resin in hot water treatment.

Another object of the invention is to provide a multilayer structure containing the resin composition of the invention. The multilayer structure of the invention is capable of suppressing lowering of gas barrier ability, which is frequently caused in subjecting a conventional multilayer structure having a gas barrier layer containing EVOH resin as a primary component to hot water treatment. Accordingly, the multilayer structure of the invention is particularly useful as a packaging material for use in boiling food, or subjected to retort treatment.

BRIEF DESCRIPTION OF THE DRAWING

FIG. 1 is a graph showing a result of dynamic viscosity behavior of resin compositions in Examples and Comparative Example.

DETAILED DESCRIPTION OF THE INVENTION

Resin Composition

The resin composition of the present invention comprises an EVOH resin (A), a polyamide resin (B), and an inorganic salt (C) capable of forming a hydrate wherein the content amount of the inorganic salt (C) is in the range of 2 to 50 parts by mass based on 100 parts by mass of the EVOH resin (A), and the mass ratio of the polyamide resin (B) to the inorganic salt (C), i.e. (B)/(C), is in the range of 95/5 to 5/95.

<EVOH Resin (A)>

EVOH resin (A) used in the invention is obtained by saponifying after copolymerizing ethylene and vinyl ester. Conventional EVOH resins used as a material of a packaging film for food are generally exemplified. A known polymerization method such as solution polymerization, suspension polymerization, emulsion polymerization or the like can be employed for copolymerization of ethylene and vinyl ester. Ethylene-vinyl alcohol copolymer is obtained by saponifying thus obtained ethylene-vinyl ester copolymer by a known saponifying method.

Examples of the vinyl ester include aliphatic vinyl esters such as vinyl formate, vinyl acetate, vinyl propionate, vinyl valerate, vinyl butyrate, vinyl isobutyrate, vinyl pivalate, vinyl caprate, vinyl laurate, vinyl stearate, and vinyl barsatate; and aromatic vinyl esters such as vinyl benzoate. In particular, an aliphatic vinyl ester generally having 3-20 carbon atoms, preferably 4-10 carbon atoms, more preferably 4-7 carbon atoms is used as the vinyl ester. Preferred is vinyl acetate from the economic viewpoint. These vinyl esters are usually used alone, or in combination of two or more of them, as occasional demands.

The content of ethylene structural unit in EVOH-resin (A), which is measured in accordance with ISO14663, is in the range of usually 20 to 60 mol %, preferably 25 to 50 mol %, more preferably 29 to 48 mol %. When the content is unduly low, gas barrier property under a high humidity condition, and melt moldability tend to be impaired, and to the contrary, when the content is unduly high, gas barrier property tends to become insufficient.

The saponification degree of the vinyl ester component contained in EVOH resin (A), which is measured in accordance with JIS K6726, is in the range of usually 90 to 100 mol %, preferably 95 to 100 mol %, more preferably 99 to 100 mol %. When the saponification degree is unduly low, gas barrier property, heat stability, moisture resistance and the like tend to be impaired.

The melt flow rate (MFR) (210° C., loading: 2,160 g) of EVOH resin (A) is in the range of usually 0.5 to 100 g/10 minutes, preferably 1 to 50 g/10 minutes, more preferably 3 to 35 g/10 minutes. When the MFR is unduly high, film forming property may become instable, and when the MFR is unduly low, viscosity becomes too high to make melt extrusion difficult to perform, so that both these cases are not desirable.

EVOH resin (A) may contain a copolymerizable ethylenically unsaturated monomer within a range not impairing the effects of the present invention, preferably in a content of not more than 10 mol %. Examples of the copolymerizable monomer include, for instance, olefins such as propylene, 1-butene, and isobutene; hydroxyl-containing α-olefins such as 3-butene-1-ol, 4-pentene-1-ol, 5-hexene-1,2-diol, and its derivatives such as its ester or an acylated compound; unsaturated acids such as acrylic acid, methacrylic acid, crotonic acid (anhydrous), phthalic acid (anhydrous), maleic acid (anhydrous), itaconic acid, and its salts, and its mono- or dialkyl ester having 1-18 carbon atoms; acrylamides such as acrylamide, N-alkylacrylamide having 1-18 carbon atoms, N,N-dimethylacrylamide, 2-acrylamidepropanesulfonic acid and its salts, and acrylamidepropyldimethylamine and its salts or its quanternary salts; methacrylamides such as methacrylamide, N-alkylmethacrylamide having 1-18 carbon atoms, N,N-dimethylmethacrylamide, 2-methacrylamidepropanesulfonic acid, or its salts, methacrylamidepropyldimethyl amine, and its salts or its quaternary salts; N-vinylamides such as N-vinyl pyrrolidone, N-vinylformamide, and N-vinylacetamide; vinyl cyanides such as acrylonitrile, and methacrylonitrile; vinyl ethers such as alkyl vinyl ether having 1-18 carbon atoms, hydroxyalkyl vinyl ether, and alkoxyalkyl vinyl ether; halogenated vinyl compounds such as vinyl chloride, vinylidene chloride, vinyl fluoride, vinylidene fluoride, and vinyl bromide; vinylsilanes such as trimethoxyvinylsilane; halogenated allyl compounds such as allyl acetate and allyl chloride; allyl alcohols such as allyl alcohol, and dimethoxy allyl alcohol; trimethyl(3-acrylamide-3-dimethylpropyl)ammonium chloride, acrylamide-2-methylpropanesulfonic acid and the like.

The EVOH resin containing hydroxyl-containing α-olefin is preferable due to the improvement of melt moldability. In particular, the EVOH resin having 1,2-diol as a side chain is preferable.

Specifically, the EVOH resin having 1,2-diol as a side chain is a polymer containing the structural unit (1) represented by the following formula.

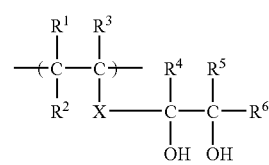

(1)

In the above general formula (1), each of $R^1$, $R^2$, and $R^3$ represents independently hydrogen atom or an organic group, X represents a single bond or a linking chain, and each of $R^4$, $R^5$, and $R^6$ represents independently hydrogen atom or an organic group.

Non-limiting examples of the organic group used as $R^1$ to $R^6$ include saturated hydrocarbon groups such as methyl, ethyl, n-propyl, iso-propyl, n-butyl, iso-butyl, tert-butyl; aromatic hydrocarbon groups such as phenyl, benzyl and the like; halogen atoms; hydroxyl group; acyloxy groups; alkoxycarbonyl groups; carboxyl groups; sulfonic acid, and the like.

Any of $R^1$ to $R^6$ is a saturated hydrocarbon group usually having 1 to 30 carbon atoms, preferably 1 to 15 carbon atoms, more preferably 1 to 4 carbon atoms, or hydrogen atom, further more preferably hydrogen atom. Accordingly, all of $R^1$ to $R^6$ being hydrogen atoms is most preferable.

X in the general formula (I) is typically a single bond. Accordingly, the most preferable 1,2-diol structural unit represented by the general formula (1) has a structure where all of $R^1$ to $R^6$ are hydrogen atoms and X is single bond, namely, the structural unit represented by the following formula (1a).

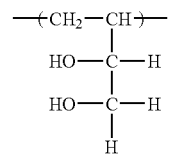

(1a)

X in the general formula (I) may be linking chain, as far as the effects of the present invention are not inhibited. Examples of the linking chain include a hydrocarbon such as alkylene, alkenylene, alkynylene, phenylene and naphthylene (these hydrocarbons can be substituted with a halogen such as fluorine, chlorine, or bromine etc.); an ether binding site-containing structural unit such as —O—, —(CH$_2$O)$_m$—, —(OCH$_2$)$_m$—, —(CH$_2$O)$_m$CH$_2$—; a carbonyl group-containing structural unit such as —CO—, —COCO—, —CO(CH$_2$)$_m$CO—, —CO(C$_6$H$_4$)CO—; a sulfur atom-containing structure such as —S—, —CS—, —SO—, —SO$_2$—; a nitrogen-containing structure such as —NR—, —CONR—, —NRCO—, —CSNR—, —NRCS—, —NRNR—; a hetero atom such as phosphorus atom-containing structure such as —HPO$_4$—; a metal atom-containing structure such as silicon atom-containing structure (e.g. —Si(OR)$_2$—, —OSi(OR)$_2$—, —OSi(OR)$_2$O—), titanium atom-containing structure (e.g. —Ti(OR)$_2$—, —OTi(OR)$_2$—, —OTi(OR)$_2$O—), aluminum atom-containing structure (e.g. —Al(OR)—, —OAl(OR)—, —OAl(OR)O—) wherein each of R represents independently any substituent, preferably hydrogen atom or an alkyl group, and m is a positive integer, usually 1-30, preferably 1-15, more preferably 1-10). Among these linking chains, —CH$_2$OCH$_2$— and a hydrocarbon chain having 1-10 carbon atoms are preferable, a hydrocarbon chain having 1-6 carbon atoms is more preferable, a hydrocarbon chain having 1 carbon atom is most preferable, from the viewpoint of stability when the resin composition is produced or used.

EVOH resin (A) used in the invention may contain known additives within the range not impairing the object of the invention, specifically, not more than 10% by mass based on the mass of EVOH resin. For the purpose of, for instance, imparting heat stability or adjusting melt viscosity, minute quantities of acid such as acetic acid, phosphoric acid, boric acid, or metal salt such as alkali metal salt thereof or alkaline earth metal salt thereof (these salts are usually saturated hydrates) may be contained. Other examples of the additives include a saturated aliphatic amide (e.g. stearic acidamide), an unsaturated fatty acid amide (e.g. oleic acid amide), a bis-fatty acid amide (e.g ethylene bis-stearic acid amide), and low molecular weight polyolefin (e.g. low molecular weight polyethylene having a molecular weight of about 500 to 10000, or low molecular weight polypropylene) as a slipping agent; an aliphatic polyvalent alcohol such as ethyleneglycol, glycerol, hexanediol or the like as a plasticizer; light stabilizer, antioxidant, drying agent, ultraviolet absorber, colorant, antistatic agent, surfactant, antimicrobial agent, anti-blocking agent, insoluble inorganic salt (e.g. hydrotalcite), filler (e.g. inorganic filler), oxygen absorbent and the like.

<Polyamide Resin (B)>

Polyamide resin (B) can form network structure by interaction of amide binding site thereof with a hydroxyl group and/or ester group of EVOH resin (A).

A known polyamide resin may be used as the polyamide resin (B). Specific examples include homopolymers such as nylon-6 and nylon-12; and hetero copolymers such as nylon-66 and nylon-6/12.

Further, a terminal-modified polyamide resin may be used as the polyamide resin (B). Examples of the terminal-modified polyamide resin include a modified polyamide resin by reaction of a terminal of a polyamide with, for instance, alkyl group having 1-22 carbon atoms. A commercially available terminal-modified polyamide resin may be used. The terminal-modified polyamide resin modified with alkyl group generally corresponds to a polyamide including N-substituted amide generated by reaction of a terminal of an unmodified polyamide with terminal control agent.

A preferable example of the terminal-modified polyamide resin satisfies the following equation:

$$100 \times Y/(X+Y) \geqq 5$$

In the above equation, X represents the number of terminal COOH groups and Y represents the number of terminal CONRR' groups wherein R is a hydrocarbon group having 1-22 carbon atoms, and R' is hydrogen atom or a hydrocarbon group having 1 to 22 carbon atoms. In summary, a preferable terminal-modified polyamide has carboxyl groups at the content of not less than 5% based on the total number of carboxyl groups contained in the polyamide before modification.

A polyamide resin having relatively low modified amount remains a lot of carboxyl groups, which may react with EVOH resin to generate gel or the like when melt-extruding, resulting in a tendency to form a film with unfavorable appearance. The terminal-modified polyamide resin (B) can be produced by, for instance, a method disclosed in JP-8-19302 B.

Any amine reactable with a carboxyl group can be used as the terminal control agent in order to decrease the content of carboxyl groups in the polyamide resin. Such amine may be mono- or di-substituted amine represented by HNRR'. In the case of mono-substituted amine, R' is hydrogen atom.

In the case that R' and/or R' is a hydrocarbon group, any hydrocarbon group without carboxyl group may be used. R' and/or R' may contain another functional group such as hydroxyl group, amino group, carbonyl group within the range not impairing the gist of the present invention, preferably aliphatic hydrocarbon group.

R and R' may be the same or different, may be a hydrocarbon group usually having 1-22 carbon atoms, preferably 5-20 carbon atoms.

Preferably, the content amount of unmodified carboxyl group at a terminal of terminal-modified polyamide resin is small. Generally, the value (molar equivalent with respect to 1 g polymer) obtained by dissolving polyamide resin in benzyl alcohol, and titrating with 0.1N sodium hydrate aqueous solution is 0 to 50 µeq/1 g polymer, and preferably 0 to 30 µeq/1 g polymer, and particularly preferably 0 to 25 µeq/1 g polymer. If the value is unduly large, a gel may be generated in forming a film, which may deteriorate the film appearance, and lower the hot water resistance. On the other hand, if the value is unduly small, the productivity is likely to be lowered. In view of the above, it is preferable to remain a certain amount of carboxyl group. Normally, the value is 5 to 50 µeq/1 g polymer, preferably 10 to 30 µeq/1 g polymer, and particularly preferably 15 to 25 µeq/1 g polymer.

A melting point of polyamide resin (B) falls in the range of usually 200 to 250° C., preferably 200 to 230° C.

The amount of polyamide resin (B) in the resin composition of the invention is in the range of usually 1 to 25 parts by mass, preferably 3 to 15 parts by mass, more preferably 3 to 8 parts by mass, based on 100 parts by mass of EVOH resin (A). When the content amount of the polyamide resin is unduly small, the effect of suppressing elution of EVOH resin against hot water treatment is likely to be insufficient, and to the contrary, when the content amount of polyamide resin is unduly large, long-run processability and gas barrier property tend to be deteriorated.

In the case of blending polyamide resin with EVOH resin for the purpose of improving hot water resistance, the content amount of polyamide resin usually falls in the range of about 20 to 30 parts by mass based on 100 parts by mass of EVOH resin. However, since the resin composition of the invention contains an inorganic salt capable forming a hydrate, the content amount of polyamide resin in the resin composition falls in the range of 1 to 25 parts by mass, preferably 3 to 8 parts by mass, based on 100 parts by mass of EVOH resin.

<Inorganic Salt (C) Capable of Forming a Hydrate>

Inorganic salt (C) capable of forming a hydrate used in the invention is an inorganic salt capable of holding $H_2O$ molecules as crystallized water. Generally, a dehydrated inorganic salt by drying an inorganic salt hydrate (normally monohydrate to pentadecahydrate, preferably trihydrate to decahydrate), may be used. Anhydrous inorganic salt is preferably used, however, a hydrate absorbing water in an amount of less than saturation may be used.

Regarding inorganic salt (C) capable of forming a hydrate, a metal salt of phosphoric acid is usually used. Examples of the metal include alkali metal and alkaline earth metal, preferably alkali metal, more preferably potassium and sodium.

Examples of the inorganic salt (C) include alkali metal phosphoric acid salt such as sodium phosphate (sodium dihydrogen phosphate, disodium hydrogen phosphate, trisodium phosphate) and potassium phosphate; alkaline earth metal phosphates such as magnesium phosphate and calcium phosphate; alkali metal pyrophosphates such as sodium pyrophosphate and potassium pyrophosphate; and alkaline earth metal pyrophosphates such as magnesium pyrophosphate and calcium pyrophosphate. From the viewpoint of productivity and safety, an alkali metal pyrophosphate is preferable, and sodium pyrophosphate is more preferable. These may be used alone, or in combination of two or more thereof.

These inorganic salts (C) are water-soluble, and form hydrate in an aqueous solution. Therefore, the inorganic salt (C) is preferably blended by melt-kneading or the like when preparing the resin composition.

The content amount of the inorganic salt (C) is in the range of usually 2 to 50 parts by mass, preferably 2 to 20 parts by mass, more preferably 2 to 15 parts by mass, based on 100 parts by mass of EVOH resin (A).

The content ratio of polyamide resin (B) to inorganic salt (C), i.e. (B)/(C), falls in the range of 95/5 to 5/95, preferably 85/15 to 10/90, more preferably 70/30 to 15/85, particularly preferably 60/40 to 30/70. When the content of the inorganic salt (C) is unduly high, EVOH resin is likely to be eluted from the film made of the resin composition during hot water treatment, and to the contrary, when the content of the inorganic salt (C) is unduly low, the film after hot water treatment is likely to be insufficient in gas barrier property.

The resin composition of the present invention may optionally contain a known additive such as plasticizer, filler, anti-blocking agent, antioxidant, colorant, antistatic agent, ultraviolet absorber, slipping agent within the range of the effect of the invention not being inhibited (for example, not more than 1% by mass), in addition to the above-mentioned components.

<Preparing Method of the Resin Composition>

The components (A), (B), and (C) are normally mixed by melt-kneading. The order of blending is not specifically limited, and blending may be performed by one of the following methods (1) to (4).

(1) simultaneously blend (A), (B), and (C)
(2) blend (A) and (B) in advance, and blend (C)
(3) blend one of (A) and (B), and (C) in advance, and blend the other one of (A) and (B)
(4) prepare a composition by blending (A) and/or (B), and an excessive amount of (C) in advance, and add (A) and/or (B) to the composition, thereby reducing the content ratio of (C).

It is essential that inorganic salt (C) has a hydrate forming ability in a molded product produced by molding a resin composition. Accordingly, it is difficult to employ the preparation method disclosed in e.g. JP2000-136281A i.e. a method of adding inorganic salt (C) by immersing EVOH resin (A) and/or polyamide resin (B) in an aqueous solution of inorganic salt (C), because the method is likely to lower the hydrate forming ability of inorganic salt (C).

Any method of blending, for instance, a method of dry-blending with Banbury mixer, and a method of melt-mixing with uniaxial or biaxial extruder to form pellets and dry the pellets, and the like method of blending may be adopted in the above-mentioned melt-kneading.

[Applications of the Resin Composition]

The resin composition of the invention can be molded into film, sheet, cup, bottle by a method of melt-extruding. A method of melt-extruding, a method of extruding (T-die extruding, inflation extruding, blow molding, melt spinning, profile extruding and so on), and injection molding are mainly adopted. The melt-extruding temperature is generally selected from the range of 150 to 300° C.

The molded articles thus produced may be used for various applications as it is, however, the molded articles are usually used as a multilayer structure obtained by laminating on other substrate in order to improve strength thereof and impart other properties.

Regarding the other substrate, a thermoplastic resin is useful. Examples of the thermoplastic resin include polyethylenes such as linear low density polyethylene, low density polyethylene, ultra low density polyethylene, middle density polyethylene, and high density polyethylene; polyolefins such as polypropylene, ethylene-propylene (block or random) copolymer, propylene α-olefin (α-olefin having 4 to 20 carbon atoms) copolymer, polybutene, and polypentene; graft-modified polyolefins obtained by modifying these polyolefin with an unsaturated carboxylic acid or ester thereof, ionomer, ethylene-vinyl acetate copolymer, ethylene-acrylic acid copolymer, ethylene-acrylic acid ester copolymer, polyester resin, and polyamide resin (also including polyamide-based copolymer); halogenated polyolefins such as vinyl polychloride, vinylidene polychloride, an acryl resin, polystyrene, vinyl ester resin, polyester elastomer, polyurethane elastomer, chlorinated polyethylene, and chlorinated polypropylene; aromatic or aliphatic polyketones, and polyalcohols obtained by reducing these polyketones. From the points of the practicability such as physical properties (in particular, strength) of multilayer structures, polyolefin-based resin and polyamide-based resin are preferably used, in particular, polyethylene and polypropylene are more preferably used.

These resins used for the substrate may contain a known antioxidant, antistatic agent, slipping agent, nucleating agent, anti-blocking agent, ultraviolet absorber, wax and the like within the range of not inhibiting the gist of the invention.

The lamination method of laminating the resin composition with other substrate can employ various known laminating methods. Examples of the lamination method include a method of melt-extruding other substrate to be laminated on the film, sheet and the like of the resin composition of the invention; to the contrary, a method of melt-extruding the resin to be laminated on other substrate; a method of co-extruding the resin and other substrate; a method of dry-laminating the resin (layer) and other substrate (layer) using known adhesives such as an organotitanium compound, an isocyanate compound, a polyester compound, and polyurethane compound; a method coating resin solution on other substrate and eliminating solvent from the solution.

Among them, a method of co-extruding is preferable from the viewpoint of costs and ecology.

As the layer structure of the multilayer structure, not only the double layer structure of a/b but also arbitrary combinations such as b/a/b, a/b/a, a1/a2/b, a/b1/b2, b2/b1/a/b1/b2, b2/b1/a/b1/a/b1/b2 are possible, wherein "a" (a1, a2, . . . ) represents a layer containing the resin composition of the invention, and "b" (b1, b2, . . . ) represents a thermoplastic resin-containing layer. A recycled layer is obtained by remelt-extruding end parts or defective products generated during formation of the multilayer structure. When the recycled layer comprising a mixture of the inventive resin composition and thermoplastic resin is referred to as "R", b/R/a, b/R/a/b, b/R/a/R/b, b/a/R/a/b, b/R/a/R/a/R/b and the like are possible.

An adhesive resin layer may be disposed at respective interlayers in the above-mentioned layer structure if necessary. Any known adhesive resins can be used as the adhesive resin. The adhesive resin is appropriately selected, because the suitable adhesive resin layer is varied depending on the kind of the resin contained in the b layer. Typically, a modified olefin polymer containing carboxyl group obtained by chemically bonding unsaturated carboxylic acid or its anhydride with a polyolefin by addition reaction and graft reaction can be mentioned. Specific examples include a maleic anhydride graft modified polyethylene, a maleic anhydride graft modified polypropylene, a maleic anhydride graft modified ethylene-propylene (block or random) copolymer, a maleic anhydride graft modified ethylene-ethyl acrylate copolymer, and a maleic anhydride graft modified ethylene-vinyl acetate copolymer, and one or a mixture of two or more selected from these polymers are preferably used. Furthermore, EVOH resin composition, other EVOH resin, rubber-elastomer components such as a polyisobutylene and ethylene-propylene rubber, the resin contained in the b layer, or the like can be blended with these adhesive resins. In particular, the adhesiveness is occasionally improved by blending a polyolefin resin different from the polyolefin resin being the main component of the adhesive resin and it is useful.

Thus obtained multilayer structures are subsequently subjected to apply a (heat) drawing treatment, as needed. The (heat) drawing treatment means uniform forming of a thermally uniformly heated film or sheet-shaped multilayer structure into a tube or film by chuck, plug vacuum force, pneumatic force, blow and the like. The drawing may be either uniaxial drawing or biaxial drawing. In the case of biaxial drawing, any of simultaneous biaxial drawing and sequential biaxial drawing can be used.

Regarding drawing methods, a method capable of drawing at high ratio can be employed among roll drawing, tenter drawing, tubular drawing, draw blowing, and vacuum forming. In the case of biaxial drawing, any of simultaneous biaxial drawing and sequential biaxial drawing can be used. The drawing temperature is selected from the range of usually 40 to 170° C., preferably 60 to 160° C. When the drawing temperature is unduly low, drawing property is likely to deteriorate. On the other hand, when the drawing temperature is unduly high, it is difficult to maintain a stable drawing condition.

In order to impart size stability after drawing, heat setting may be subsequently conducted. The heat setting may be conducted with well-known techniques, for instance, heat treatment for 2 to 600 seconds at a temperature of 80 to 180° C., preferably 100 to 165° C., with keeping the oriented film under the stretched condition.

When a stretched multilayer film comprising the inventive resin composition-containing layer is used as shrink film, cooling treatment, for instance, cool setting the stretched film by cool air, is conducted in place of the above-mentioned heat setting, in order to impart heat shrinkable property.

The thickness of thermoplastic resin layers of the multilayer structure is selected from the range of usually 10 to 1000 μm, preferably 50 to 500 μm, depending on layer structure, kind of thermoplastic resin, kind of adhesive resin, use, packaging embodiment, and required properties and so on. The thickness of the adhesive resin layers is selected from the range of usually 5 to 500 μm, preferably 10 to 250 μm.

The thickness of the EVOH resin composition-containing layer is in the range of usually 5 to 500 μm, preferably 10 to 250 μm, more preferably 20 to 100 μm, depending on the required gas barrier property and so on. When the thickness is unduly thin, it is difficult to impart sufficient gas barrier property, and to the contrary, when the thickness is unduly thick, the obtained film is likely to lack flexibility.

In the case where another substrate is formed on the multilayer structure by extrusion coating, or a film or a sheet of another substrate is laminated using an adhesive agent, the another substrate may be a substrate (such as paper; a metallic foil; a uni-axially or bi-axially drawn plastic film or sheet, including the film or the sheet having an inorganic compound deposited layer thereon; a woven fabric, a non-woven fabric, a metal fiber felt, and a wooden substrate), other than a substrate of the thermoplastic resin.

Containers or cover members such as bags, cups, trays, tubes, and bottles made of the film, the sheet, or the drawn film produced in the above manner are useful as packaging containers for seasonings such as mayonnaise and dressings, fermented foods such as "miso" (fermented soy bean paste), fats and oils such as cooking oil, beverages, cosmetics, and medicines, as well as general foods.

Particularly, the layer made of the inventive resin composition is capable of suppressing elution of EVOH resin against hot water treatment, and has excellent gas barrier property even after hot water treatment. Accordingly, the resin composition layer is particularly useful as a food packaging material to be subjected to hot water treatment.

EXAMPLE

Measurement and Evaluation Method (1) Gas Barrier Property After Hot Water Treatment A multilayer film was heat-sealed into pouch and the interior of the pouch was subjected to nitrogen substitution, followed by heat-sealing an opening thereof. The resultant pouch of the multilayer film was subjected to hot water treatment at 123° C. for 33 minutes, using a retort equipment ("RCS-40RTGN" of Hisaka Works, Ltd.). Thereafter, the pouch was allowed to stand in a constant temperature and constant humidity chamber of 23° C. and 50% RH for 3 days. And then, the oxygen concentration of the interior of the pouch was measured by a Mocon PAC CHECK MODEL-650, and the oxygen permeation amount ($cc/m^2 \cdot atm$) was calculated. The smaller the oxygen permeation amount is, the higher the gas barrier property is.

(2) Elution of EVOH Resin (2-1) Eluted Mount

A multilayer film was cut into pieces of 10×10 cm, and the film pieces were subjected to hot water treatment at 123° C. for 33 minutes, using a retort equipment ("RCS-40RTGN" of Hisaka Works, Ltd.). Thereafter, a sectional area ($\times 10^{-5}$ $cm^2$) of a cut portion of the multilayer film after the hot water treatment, where the EVOH resin and the drying agent were eluted, was measured at an end portion of the multilayer film in its laminated direction. The smaller the sectional area is, the less the elution is.

(2-2) Shape Retainability

Pellets of the resin composition were produced. The pellets were put in an aluminum cup, and subjected to hot water treatment (123° C., 33 minutes) using a steam-driven retort equipment ("SN200" of Yamato Scientific Co., Ltd.). The state (i.e. shape retainability and dissolution/non-dissolution of pellets) of the pellets after the treatment was visually observed. The state of the pellets was evaluated as follows.

○: No dissolution, and no change in shape were observed.
Δ: Pellets were partly dissolved, but the shape was retained.
X: Pellets were dissolved, and the shape was hardly recognized.

(3) Viscosity Behavior Stability 55 g of the resin composition was kneaded at 230° C. for 1 hour at 50 rpm, using a Brabender plasticoder (two-axis kneader having a screw diameter of 50 mm). A change in torque (substantially equivalent to a resin viscosity) after the kneading was measured.

Viscosity behavior stability was determined by the following equation, using a torque (T1) to be obtained 15 seconds after start of kneading, and a torque (T2) to be obtained 1 hour after start of kneading:

viscosity behavior stability=$T1 \div T2$

As the value of viscosity behavior stability is closer to 1, the value indicates that the viscosity change is small, and the resin composition has excellent long-run processability. The value of viscosity behavior stability is preferably from 1.5 to 0.5.

Example 1

Comparative Examples 1 Through 4

Saponified ethylene-vinyl acetate copolymer (A1) with 29 mol % of ethylene content, 99.7 mol % of saponification degree, and MFR 7 g/10 min (210° C., loading 2, 160 g) was used as EVOH resin (A). 6 nylon {(NOVAMID 1028EN (Mitsubishi Engineering-Plastics Corporation, melting point of 220° C., 20 μeq (molar equivalent with respect to 1 g polymer) of terminal carboxyl group/1 g polymer))} was used as polyamide resin (B). Anhydride of tetrasodium pyrophosphate was used as inorganic salt (C) capable of forming a hydrate.

First, EVOH resin (A1) and polyamide resin (B) were blended with a ratio shown in Table 1, followed by dry-blending 0.001 part of a hindered phenol compound (pentaerythrityl-tetrakis [3-(3,5-di-t-butyl-4-hydroxyphenyl) propionate] ("Irganox 1010" of Ciba Geigy), as an antioxidant. Thereafter, the mixture was put in a two-axis extruder (30 mm in screw diameter, L/D=43) having two mixing zones.

Then, inorganic salt (C) capable of forming a hydrate was side-fed by a powder feeder by the amount shown in Table 1, followed by melt-kneading (setting temperatures for the extruder: C1/C2/C3/C4/C5/C6/C7/H/D=200/210/230/230/230/230/230/230/230° C.). Then, the mixture was pelletized.

A three-component-five-layered multilayer film (PP layer/Binder layer/Comp. layer/Binder layer/PP layer) was produced, using the pellets of the resin composition (abbreviated as "Comp."), polypropylene (abbreviated as "PP") ("EA6A" of Japan Polypropylene Corporation), and an adhesive resin (abbreviated as "Binder") ("MODIC-AP P604V" of Mitsubishi Chemical Corporation).

The three-component-five-layered multilayer film was produced by using a co-extruding multi-layered film forming extruder system (all the die temperatures were set to 230° C.) equipped with three extruders, a three-component-five-layered feed block, multilayered film forming dies, and a winder, by a co-extruding process, while cooling the film by a chilled roll using circulating cool water. The thicknesses of PP layer/Binder layer/Comp. layer/Binder layer/PP layer of the multilayer film were 120 μm/20 μm/40 μm/20 μm/120 μm.

Gas barrier property after hot water treatment of the multilayer films (Example 1, and Comparative Examples 1 and 2) was measured and evaluated, in accordance with the above evaluation method. An eluted amount of EVOH resin with respect to the multilayer films in Comparative Examples 1 and 2 was measured. Shape retainability of the pellets of the resin composition in Comparative Examples 2, 3, and 4 was evaluated. A result of measurement and evaluation is shown in Table 1.

TABLE 1

|  |  | Example | Comparative Example | | | |
|---|---|---|---|---|---|---|
| No. | | 1 | 1 | 2 | 3 | 4 |
| Composition (part) | EVOH resin (A1) | 100 | 100 | 100 | 100 | 100 |
|  | Polyamide resin (B) | 3 | 3 | — | — | — |
|  | Inorganic salt (C) | 3 | — | — | 10 | 20 |
| Evaluation | Oxygen permeation amount(cc/m² · atm) | 180 | 353 | 430 | 156 | 106 |
|  | Eluted amount (×10⁻⁵ cm²) | — | 2 | 25 | — | — |
|  | Shape retainability | — | — | Δ | x | x |

As shown in Table 1, in Comparative Example 2, which is a resin composition containing EVOH resin but containing neither polyamide resin nor inorganic salt, an eluted amount after hot water treatment was significantly large and gas barrier property was insufficient. In Comparative Example 1, the eluted amount was lowered by addition of polyamide resin, however, the effect of blending polyamide resin was not enough to suppress lowering gas barrier property after hot water treatment. Example 1, which is a resin composition comprising a polyamide resin and inorganic salt capable of forming a hydrate in addition to EVOH resin, showed that addition of the inorganic salt enables to prevent gas barrier property from lowering.

On the other hand, Comparative Examples 3 and 4, where the inorganic salt was blended but the polyamide resin not blended, showed that gas barrier property were improved by addition of a large amount of the inorganic salt. However, the results of shape retainability test in these Comparative Examples were not good. Pellets of Comparative Examples 3 and 4 were desolved to the extent that their shapes were hardly recognized, while pellets of Comparative Example 2 retained shape thereof. These results showed that a resin composition containing a hydrate-forming inorganic salt in addition to EVOH resin in the absence of polyamide resin is likely to increase an eluted amount of EVOH resin, as compared with EVOH resin composition containing neither inorganic salt nor polyamide resin.

Examples 2 Through 5 And

Comparative Example 5

Saponified ethylene-vinyl acetate copolymer (A2) (MFR 5 g/10 minutes (210° C., loading 2160 g)) was prepared by adding 360 ppm of magnesium acetate (4 hydrate) to EVOH resin (A1). The same manner as Example 1 was executed to produce a multilayer film, except that the prepared EVOH resin (A2) was used in the place of EVOH resin (A1), or except that the amounts of EVOH resin (A), polyamide resin (B), and inorganic salt (C) were changed as shown in Table 2. An eluted amount of EVOH resin and viscosity behavior stability with respect to the obtained multilayer films were measured and calculated. The results are shown in Table 2 and their dynamic viscosity behavior is shown in FIG. 1.

TABLE 2

| Items | No. | Example | | | | Comparative Example |
| --- | --- | --- | --- | --- | --- | --- |
| | | 2 | 3 | 4 | 5 | 5 |
| Compo- | EVOH resin (A2) | 100 | 100 | 100 | 100 | 100 |
| sition | Polyamide resin (B) | 3 | 4 | 2 | 11 | — |
| (part) | Inorganic salt (C) | 3 | 9 | 10 | 12 | — |
| Content ratio ((B)/(C)) | | 1 | 0.4 | 0.1 | 0.9 | — |
| Evalua- | Eluted amount ($\times 10^{-5}$ cm$^2$) | 2 | 2 | 5 | 0 | 25 |
| tion | Viscosity behavior stability | 0.9 | 1.1 | 0.9 | 1.7 | 0.1 |

As shown in Comparative Example 5, EVOH resin (A2) is an EVOH resin having a peculiar viscosity behavior such that the viscosity is lowered by adding a small amount of magnesium acetate tetrahydrate. Comparative Example 5 also shows that an eluted amount of EVOH resin is significantly large, in the case that neither the polyamide resin nor inorganic salt are included.

Example 5 shows that the elution of EVOH resin after hot water treatment can be sufficiently suppressed by containing 11 mass parts of polyamide resin with respect to 100 mass parts of EVOH resin. However, the viscosity was slightly increased.

In Examples 3, 4, and 5, 9 mass parts or more of inorganic salt (C) was added with respect to 100 mass parts of EVOH resin. As far as a large amount of polyamide resin was contained (Examples 3 and 5), an increase in the eluted amount of EVOH resin by adding a large amount of inorganic salt (C) was not observed. The result shows that it is important to properly set the content ratio of inorganic salt and polyamide resin to efficiently obtain the gas barrier effect by addition of the inorganic salt, and the effect of suppressing elution of EVOH resin by addition of the polyamide resin.

In Examples 2 and 3, excellent long-run processability was obtained, as well as the effect of suppressing elution of EVOH resin by addition of the polyamide resin, and the gas barrier effect by addition of the inorganic salt.

What is claimed is:

1. A resin composition comprising a saponified ethylene-vinyl ester copolymer (A), a polyamide resin (B), and an inorganic salt (C) capable of forming a hydrate,
   wherein the content amount of the inorganic salt (C) is in the range of 2 to 50 parts by mass based on 100 parts by mass of the saponified ethylene-vinyl ester copolymer (A)., and the mass ratio ((B)/(C)) of the polyamide resin (B) to the inorganic salt (C) is in the range of 95/5 to 5/95.

2. A resin composition according to claim 1, wherein the inorganic salt (C) is a dehydrated inorganic salt obtained by drying an inorganic salt tri- to decahydrate.

3. A resin composition according to claim 1, wherein the inorganic salt (C) is a phosphoric acid salt capable of forming a hydrate.

4. A resin composition according to claim 1, wherein the ethylene content of the saponified ethylene-vinyl ester copolymer (A) is in the range of 20 to 60% by mol.

5. A resin composition according to claim 1, wherein a saponification degree of the saponified ethylene-vinyl ester copolymer (A) is in the range of 90 to 100 mol %.

6. A resin composition according to claim 1, wherein MFR (210° C., loading: 2160 g) of the saponified ethylene-vinyl ester copolymer (A) is in the range of 0.5 to 100 g/10minutes.

7. A resin composition according to claim 1, wherein the saponified ethylene-vinyl ester copolymer (A) is a saponified ethylene-vinyl acetate copolymer.

8. A resin composition according to claim 1, wherein the content amount of the polyamide resin (B) is in the range of 1 to 25 parts by mass based on 100 parts by mass of the saponified ethylene-vinyl ester copolymer (A).

9. A resin composition according to claim 1, wherein the content of the polyamide resin (B) is in the range 3 to 8 parts by mass based on 100 parts by mass of the saponified ethylene-vinyl ester copolymer (A).

10. A multilayer structure comprising at least one layer of the resin composition claimed in claim 1.

11. A multilayer structure according to claim 10, wherein a hydrocarbon resin-containing layer exists on at least one side of the layer of the resin composition claimed in claim 1.

12. A resin composition according to claim 1, wherein the content amount of the inorganic salt (C) is in the range of 2 to 15 parts by mass based on 100 parts by mass of the saponified ethylene-vinyl ester copolymer (A).

13. A resin composition according to claim 1, wherein the mass ratio of the polyamide resin (B) to the inorganic salt (C) is in the range of 60/40 to 30/70.

* * * * *